United States Patent
Waters

(10) Patent No.: US 9,760,522 B2
(45) Date of Patent: Sep. 12, 2017

(54) MESSAGE RECIPIENT DISCRIMINATION USING START-OF-PACKET DELIMITERS

(71) Applicant: Texas Instruments Incorporated, Dallas, TX (US)

(72) Inventor: Deric Wayne Waters, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 218 days.

(21) Appl. No.: 14/680,935

(22) Filed: Apr. 7, 2015

(65) Prior Publication Data

US 2015/0286605 A1 Oct. 8, 2015

Related U.S. Application Data

(60) Provisional application No. 61/976,604, filed on Apr. 8, 2014.

(51) Int. Cl.
*G06F 3/00* (2006.01)
*G06F 13/42* (2006.01)
*G06F 13/38* (2006.01)

(52) U.S. Cl.
CPC ........ *G06F 13/4221* (2013.01); *G06F 13/382* (2013.01); *G06F 13/4295* (2013.01)

(58) Field of Classification Search
None
See application file for complete search history.

(56) References Cited

U.S. PATENT DOCUMENTS 7,990,937 B2* 8/2011 Chang ................... H04L 1/0023
370/338
8,315,523 B2* 11/2012 Ogushi ................... H04L 12/40
370/352

OTHER PUBLICATIONS

"Universal Serial Bus Power Delivery Specification," Revision 1.0, Including Errata Through Mar. 11, 2014 (Version 1.3), Chapter 5, 27 pages pages.

* cited by examiner

*Primary Examiner* — Idriss N Alrobaye
*Assistant Examiner* — Richard B Franklin
(74) *Attorney, Agent, or Firm* — John R. Pessetto; Charles A. Brill; Frank D. Cimino

(57) ABSTRACT

Methods and apparatus for operating a communication system comprising three or more communication transceivers. In illustrative embodiments, multiple unique start-of-packet delimiters are maintained. A data packet to be transmitted is constructed using a specified one of the plurality of start-of-packet delimiters to demarcate the start of said data packet. The chosen start-of-packet delimiter reflects one or more transceivers that are intended recipients of said data packet. When a data packet is received by a transceiver, the start-of-packet delimiter of the received data packet is compared to one or more valid start-of-packet delimiters for the receiving transceiver. If the start-of-packet delimiter of the received data packet matches a valid start-of-packet delimiter for the receiving transceiver, the data packet is accepted, otherwise it is rejected.

16 Claims, 4 Drawing Sheets

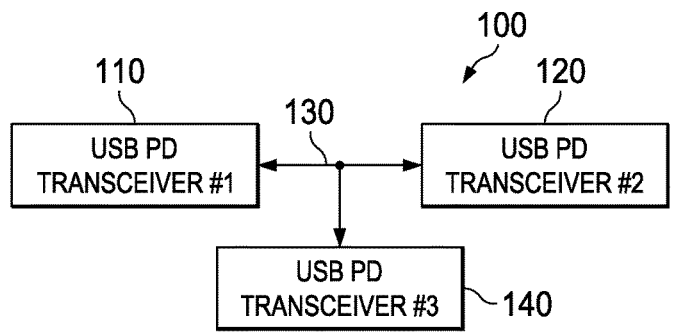
FIG. 1
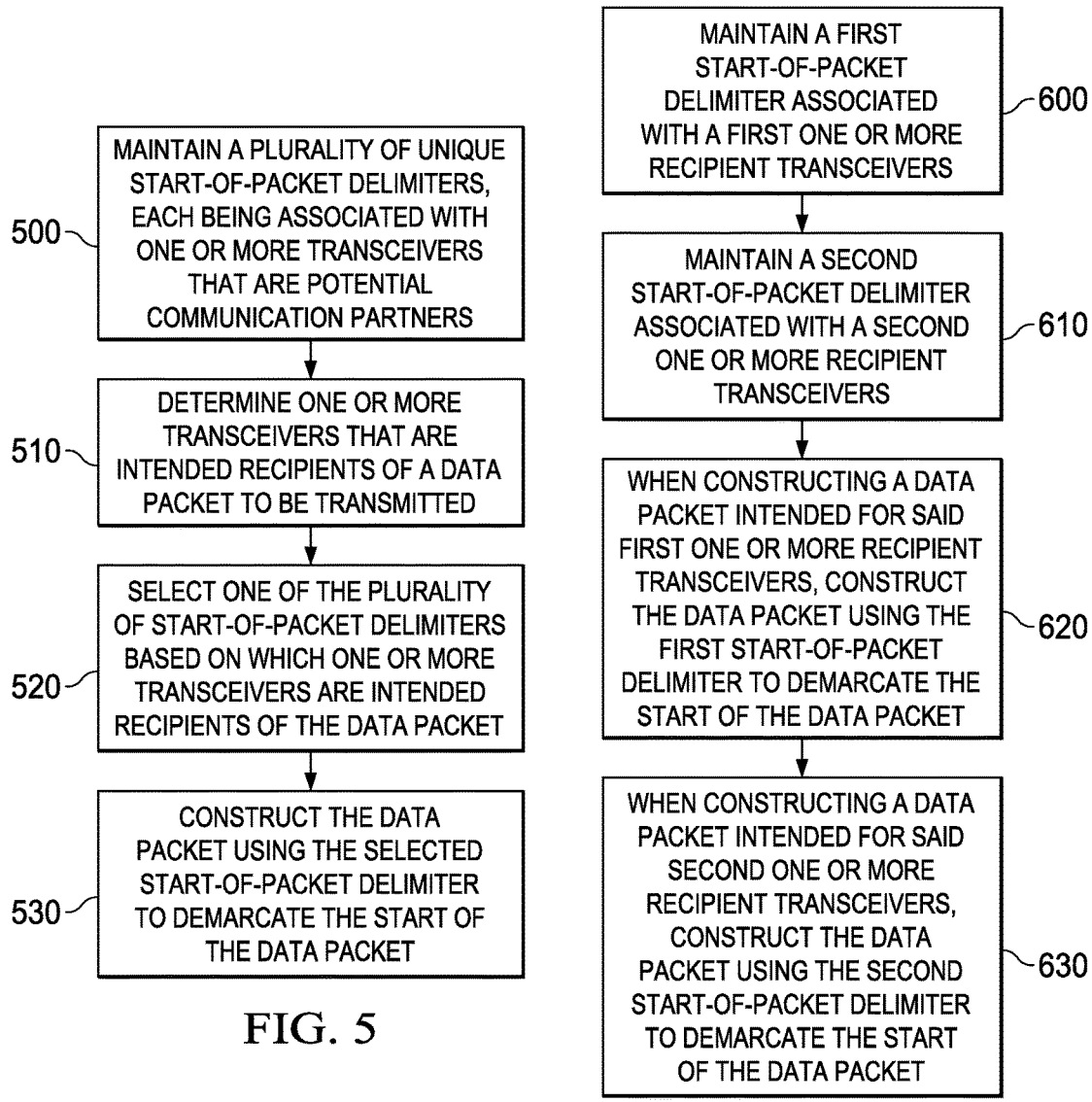
FIG. 5
FIG. 6

MESSAGE RECIPIENT DISCRIMINATION USING START-OF-PACKET DELIMITERS

CROSS-REFERENCE TO RELATED APPLICATIONS

This application claims priority to U.S. Provisional Application No. 61/976,604, filed on Apr. 8, 2014, the contents of which are hereby expressly incorporated herein by reference.

BACKGROUND

Universal Serial Bus (USB) is an industry standard that defines the cables, connectors and communications protocols used in a bus for connection, communication, and power supply between computers and electronic devices. USB was designed to standardize the connection of computer peripherals (including keyboards, pointing devices, digital cameras, printers, portable media players, disk drives and network adapters) to personal computers, both to communicate and to supply electric power. It has become commonplace on other devices, such as smartphones, PDAs and video game consoles. USB has effectively replaced a variety of earlier interfaces, such as serial and parallel ports, as well as separate power chargers for portable devices.

A new USB Power Delivery Specification has been developed to enable delivery of higher power over new USB cables and connectors. This technology creates a universal power plug for laptops, tablets, etc. that may require more than five volts using cables and plugs compatible with existing USB solutions. The USB Power Delivery (USB-PD) Specification defines a packet-based communication link between ports connected via a USB-PD cable and USB-PD connectors. The packets contain information that enables the two ports to communicate and negotiate a voltage and a current that the source port will provide to the sink port. This communication occurs on a separate wire independently from the normal USB communications that appear on the USB data wires.

It has been proposed to incorporate an in-line transceiver inside a USB-PD cable as a way of communicating information about the cable to USB devices that the cable is connected to. In some illustrative embodiments, such an in-line transceiver resides in the USB plug of the USB-PD cable. Such an in-line transceiver illustratively would include or be associated with a non-volatile memory that stores information that the transceiver can send to such connected devices. In most embodiments, the in-line transceiver would be coupled with an embedded processor. Some examples of information that could be stored in the memory and transmitted to connected devices include: current and voltage capabilities of the cable, the cable manufacturer, the length of the cable, the type of cable termination, USB data line configurability, and an indication of whether the cable is active or passive. However, adding a transceiver inside the cable means that there are multiple possible destinations for any message sent by one of the three transceivers now associated with the cable (one at each end plus the at least one in-line transceiver). Thus there is a need for a simple and efficient means for a transmitter and a receiver to distinguish intended recipients of a transmitted message.

SUMMARY

One embodiment of the present disclosure is directed to a method of operating a communication system. Pursuant to such a method, a plurality of unique start-of-packet delimiters is maintained. A data packet to be transmitted is constructed using a specified one of the plurality of start-of-packet delimiters to demarcate the start of said data packet. The chosen start-of-packet delimiter reflects one or more transceivers that are intended recipients of said data packet. When a data packet is received by a transceiver, the start-of-packet delimiter of the received data packet is compared to one or more valid start-of-packet delimiters for the receiving transceiver. If the start-of-packet delimiter of the received data packet matches a valid start-of-packet delimiter for the receiving transceiver, the data packet is accepted, otherwise it is rejected.

BRIEF DESCRIPTION OF THE DRAWINGS

FIG. 1 is a block diagram representing a USB communication system that includes two USB devices connected by a USB cable that has an in-line transceiver embedded in the cable.

FIG. 5 is a flowchart representing a method of operating a data transmitter to indicate an intended one or more recipients of a data packet to be transmitted.

FIG. 6 is a flowchart representing a method of specifying an intended recipient of a data packet to be transmitted.

DETAILED DESCRIPTION

Figure 2:
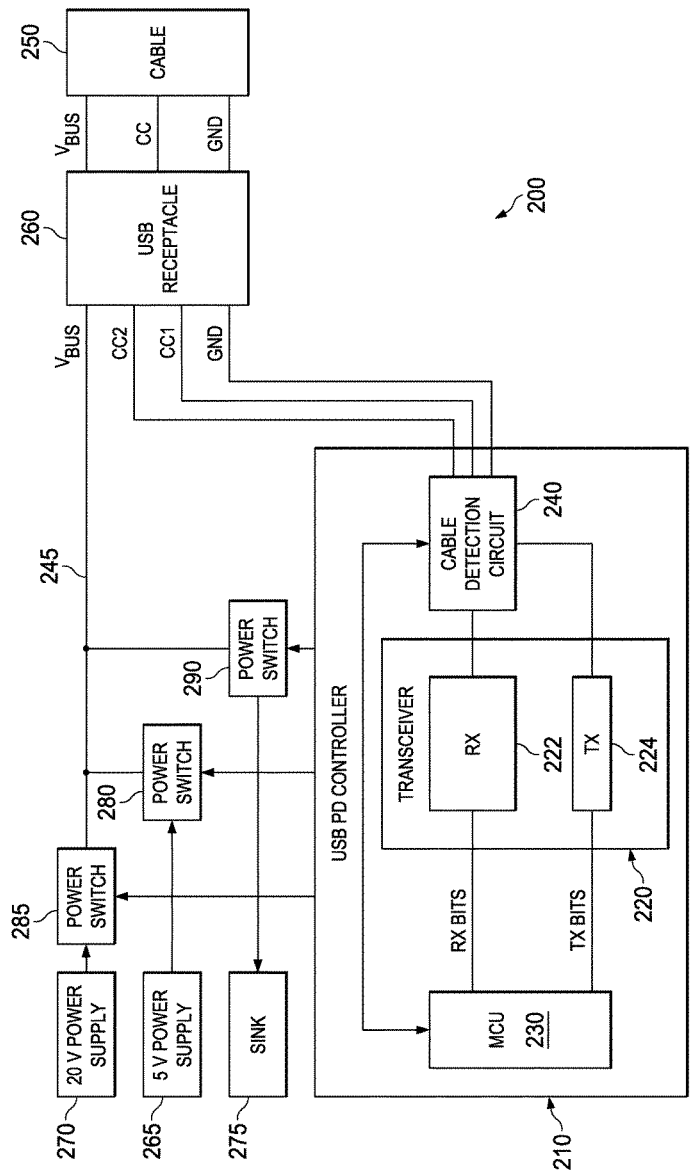
FIG. 2 is a block diagram representing an illustrative USB power-delivery device.

This disclosure is directed generally towards methods and apparatus for using start-of-packet delimiter codes to distinguish intended recipients in a multi-transceiver communication system. Such methods and apparatus will be described herein with respect to a USB communication system. However, it is to be understood that the methods and apparatus described herein can pertain to, and be implemented in, any communication system that consists of three or more transceivers and that uses start-of-packet delimiters.

FIG. 1 is a block diagram representing a USB communication system 100 that includes two USB devices connected by a USB cable that has an in-line transceiver embedded in the cable. The USB communication system 100 comprises a first USB power delivery (USB-PD) device 110 connected to a second USB-PD device 120 via USB-PD cable 130. In USB power delivery, there are four kinds of devices defined: provider-only, provider/consumer, consumer/provider, and consumer-only. USB-PD devices 110 and 120 could each be any of these four types of devices. Each USB device 110, 120 includes a USB-PD transceiver for sending and receiving messages pertaining to the delivery of power over the USB-PD cable 130. USB-PD transceiver 140 is an in-line transceiver that is embedded in the USB-PD cable 130. The transceiver 140 illustratively includes or is associated with a non-volatile memory that stores information that the transceiver can send to USB-PD device 110 and/or USB-PD device 120. In some embodiments, the in-line transceiver 140 is coupled with an embedded processor. Some examples of information that can be stored in the memory and transmitted to device 110 and/or device 120 include: the voltage capabilities of the cable, the current capabilities of the cable, the data-carrying capabilities of the cable, the cable manufacturer, the length of the cable, an indication of whether the cable is active or passive, and, if the cable is terminated by a USB receptacle, an indication of whether or not there is a plug inserted into the far end of the cable. There can also be additional in-line transceivers in the USB-PD cable 130 in addition to in-line transceiver 140. In some illustrative embodiments, in-line transceivers such as in-line transceiver 140 reside in a USB plug at the end of USB-PD cable 130. In other embodiments, one of the USB-PD transceivers 110 or 120 can be a non-USB device, such as in embodiments that employ USB Type-C receptacles and cables, which are designed to support alternate modes such as DisplayPort. In some embodiments, there is no cable in the traditional sense, for example, a laptop connected to a docking station. In such an embodiment, the USB-PD transceiver 140 can be in the docking station, for example.

FIG. 2 is a block diagram representing an illustrative USB power-delivery (USB-PD) device 200. The device 200 of FIG. 2 can both source and sink power and therefore can function as either a provider or consumer USB power-delivery device. The illustrative USB-PD device 200 of FIG. 2 could represent device 110 of FIG. 1, device 120 of FIG. 1, or both. The USB power-delivery device 200 includes a USB receptacle 260 that is capable of attachably receiving a USB connector disposed on one end of a USB cable 250, as is well known in the art. The other end of the USB cable 250 can be permanently attached to a second USB device, or can terminate at a second USB connector that can be attachably connected to a second USB-capable device. In still another embodiment, the USB cable 250 can be permanently affixed to the USB device 200. The USB power-delivery device 200 also includes a USB-PD controller 210 that controls the communications with other USB power delivery devices, via the USB cable 250, regarding power delivery, and also controls the actual sourcing of power to, or sinking of power received from, another USB power delivery device. In an illustrative embodiment, the USB cable 250 has an in-line transceiver embedded in the cable, such as the USB-PD transceiver 140 described above with respect to FIG. 1.

The USB-PD controller 210 includes a transceiver 220, a microcontroller unit 230, and a cable-type detection circuit 240. The transceiver 220 includes a receiver 222 and a transmitter 224. In an illustrative embodiment, the transceiver 220 comprises a biphase mark encoding (BMC) modem. In another illustrative embodiment, the transceiver 220 comprises a binary frequency-shift keying (BFSK) modem. The receiver 222 receives communications regarding USB power delivery from a far-end USB power-delivery device, or from an in-line transceiver embedded in the USB cable 250, as will be described in more detail below. The transmitter 224 transmits communications regarding USB power delivery to a far-end USB power-delivery device, or to an in-line transceiver embedded in the USB cable 250. Such communications with a far-end device regarding USB power delivery can include the negotiating of which device is to be the source (provide power) and which is to be the sink (receive power), and the negotiating of the voltage, current, and mode of the power delivery, as well as other information attendant to the delivery of power from one device to the other over the USB cable 250. Such communications with an in-line transceiver embedded in the USB cable 250 can include, for example, communications regarding the current and voltage capabilities of the cable, the cable manufacturer, the length of the cable, and an indication of whether the cable is active or passive.

In the illustrative embodiment shown in FIG. 2, the USB cable is a type-C USB cable and the transceiver 220 communicates with the far-end USB device and any in-line transceiver via a wire in the USB cable 250 called the communication channel (CC). In an alternative embodiment, the transceiver 220 communicates with the far-end USB device and any in-line transceiver via the voltage bus (Vbus) 245. The microcontroller unit 230 controls the operations of the USB-PD controller 210, generates messages to be sent to the far-end USB device and/or an in-line transceiver, and processes messages received from the far-end USB device or the in-line transceiver. One function performed by the microcontroller 230 is the selection of power supplies to be provided to the Vbus 245 in order to power a connected far-end device. The microcontroller can make this determination based upon a variety of factors. One such factor is what type and/or level of power supply is being requested by the far-end of device. In the illustrative embodiment of FIG. 2, such requests are received from the far-end device via the CC wire of the USB cable 250. Another such factor can be what type of USB cable 250 is inserted in the USB receptacle 260 and what power delivery mode or modes are appropriate for that USB cable type. Such cable-type information can be received from an in-line transceiver embedded in the USB cable 250 via the CC wire of the cable. In the illustrative embodiment of FIG. 2, USB-PD device 200 includes two electrical connections CC1 and CC2 connecting the USB-PD controller 210 to the USB receptacle 260. When a type-C USB cable is inserted in the receptacle 260, one of the lines CC1 and CC2 is coupled to the CC wire of the USB cable 250. The USB-PD controller 210 includes a cable detection circuit 240 that, based on signals received over lines CC1 and/or CC2, detects whether a cable is inserted in the USB receptacle 260 and, if so, detects which of CC1 and CC2 is coupled to the CC wire in the USB cable 250. In some embodiments, the cable detection circuit 240 also receives cable-type information from whichever of CC1 and CC2 is coupled to the CC wire of USB cable 250. It is to be understood that the details of how the USB-PD transceiver 200 exchanges information regarding USB power delivery with a far-end device or with an in-line transceiver are merely illustrative. Indeed, when a USB cable that is not a type-C USB cable is inserted in the USB receptacle 260, some of the details of how the transceiver 200 exchanges power delivery information will diverge from the details described above.

The USB power-delivery device 200 shown in FIG. 2 also includes two power supplies: 5-volt power supply 265 and 20-volt power supply 270. It will be appreciated that this embodiment is merely illustrative and that the USB power-delivery device 200 can include additional power supplies as well, or a single power supply whose voltage can be changed. The USB power-delivery device 200 also includes a power sink 275 that can receive power supplied over the Vbus 245 to power the USB power-delivery device 200. The USB power-delivery device 200 further includes power switches 280, 285, 290. The USB-PD controller 210 controls the power switches 280, 285, 290 in order to select a power supply and to couple the selected power supply to the Vbus 245, or to couple the power sink 275 to the Vbus 245 if the USB power-delivery device 200 is to receive power from a far-end device.

As mentioned, the USB-PD device 200 of FIG. 2 is capable of acting as a USB-PD provider or as a USB-PD consumer. An illustrative provider-only USB-PD device would include similar functionality as the device 200 of FIG. 2 but would not include the power sink 275. Similarly an illustrative consumer-only USB-PD device would include functionality similar to the device 200 but would not include the power supplies 265 and 270. An illustrative embodiment of the in-line transceiver 140 of FIG. 1 would not include either the power supplies 265, 270 or the power sink 275, but would comprise a transceiver similar to the transceiver 220 of FIG. 2, and a microcontroller similar to the microcontroller 230 of FIG. 2.

There is a physical layer built around a USB-PD transceiver, such as the transceiver 220 of FIG. 2, that allows the USB power-delivery device 200 and a far-end USB device to send power-delivery messages to one another over Vbus 245, and also allows the device 200 to communicate with an in-line transceiver that may be embedded in the USB cable 250. Above the physical layer is a protocol layer, and then a policy engine layer. In illustrative embodiments, the physical layer uses binary frequency shift keying (FSK) modulation or biphase mark coding (BMC). The physical layer also encodes the data bits in the packet using, for example, 4b5b encoding.

Figure 3:
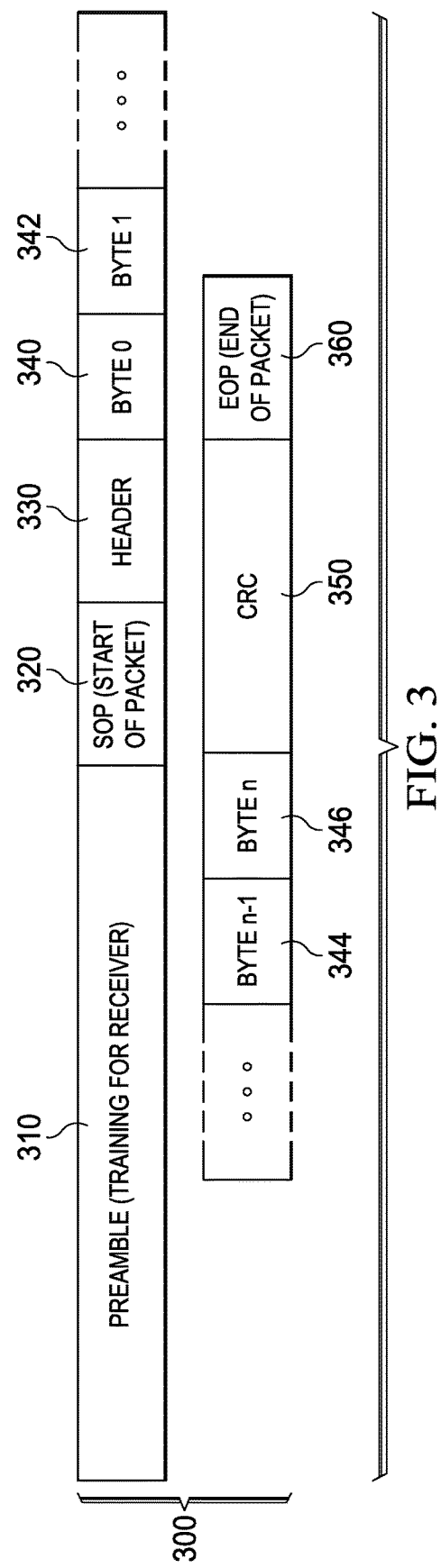
FIG. 3 is a data structure diagram representing the structure of a USB-PD data packet.

The packet format of a power-delivery data packet, according to an illustrative embodiment, is shown in FIG. 3. Each packet 300 begins with a preamble 310 which contains a sequence of alternating ones and zeros for a total of 64 bits. The preamble 310 is followed by a start-of-packet delimiter (SOP) 320, which is a predefined 20-bit code word that announces the start of a new data packet. In limited special circumstances, i.e., when a hard reset of one or more transceivers in the system is to be performed, the preamble is followed not by the start-of-packet delimiter but instead by a different predefined 20-bit sequence called the hard-reset sequence. The start-of-packet delimiter, or hard-reset sequence, is divided into four 5-bit nibbles that are called K-codes in the USB specification. A valid SOP or hard-reset sequence requires that at least three out of the four nibbles does not have any bit errors. Per the USB specification, the standard start-of-packet delimiter comprises three "Sync-1" K-codes (11000) followed by a "Sync-2" K-code (10001), where the first bit in a K-code is the last bit of that K-code to be sent on the wire. Thus the standard start-of-packet delimiter bit sequence is 00011000001100011100001. The standard hard-reset sequence per the USB specification comprises two "RST-1" K-codes (00111) followed by two "RST-2" K-codes (11001). Thus the standard hard-reset bit sequence is 11100111001110010011.

The start-of-packet delimiter 320 is followed by a header (that is encoded using the 4b5b code) which contains information used by the protocol layer. Among other information contained in the header 330 is a message-type field that indicates what kind of message the packet 300 represents. The header 330 also includes a data field (sometimes referred to as Nobj) that indicates the number of data objects that follow in the packet. When a hard-reset sequence is sent, it is not followed by a header or a data payload after the hard-reset sequence. Following the header 330 are one or more data fields 340, 342, 344, 346, encoded using the 4b5b code. For example, in a specific type of message known as a source capabilities message, the data fields 340-346 comprise data structures known as power delivery objects. The source capabilities message is a message that is sent by a USB-PD source device such as device 200 to broadcast its availability as a power source and to communicate the device's capabilities as a source. These capabilities are enumerated in the power delivery objects.

The data fields 340-346 are followed by a 32-bit cyclic redundancy check (CRC) 350. The CRC 350 is an error-detecting code used to detect accidental changes to the data contained in the data packet 300. The CRC is computed based on the header 330 and the data objects 340-346. The CRC is the 32-bit remainder of a polynomial division of the contents of the header 330 and the power delivery objects, encoded into 40 bits using the 4b5b code, as will be described in more detail below. Upon retrieval of the data packet by, say, a second USB device, the calculation is repeated, and corrective action can be taken against presumed data corruption if the check values do not match. Finally, the CRC 350 is followed by a predefined 5-bit end-of-packet delimiter (EOP) announcing the end of the data packet 300.

Referring again to FIG. 1, the presence of the in-line transceiver 140 in the USB cable 130 means that there are (at least) three transceivers in the USB communication system 100, and thus there are (at least) two possible destinations for a message sent by any of the transceivers 110, 120, 140. The present disclosure presents a method of distinguishing which messages are meant for which transceiver. To allow the transceiver 140 in the cable to be as simple as possible, a mechanism at the physical layer or protocol layer is preferable so it doesn't need to parse too many different kinds of messages. This disclosure presents a physical layer solution that uses two or more unique start-of-packet delimiters to distinguish the intended recipient of a message. USB-PD receivers are required to reject packets that do not have a valid start-of-packet delimiter or a valid hard-reset sequence at the end of the preamble. In the scheme of the present disclosure, the system maintains multiple start-of-packet delimiters. A transmitting transceiver can effect a selection of one or more intended recipients of a data packet to be transmitted via the selection of which start-of-packet delimiter it uses in said data packet.

Each transceiver in the system, i.e., coupled to the CC wire, will have one or more start-of packet delimiters that it will accept. That is, each transceiver is configured to process data packets having a specified one or more of the start-of-packet sequences and to ignore packets having any other start-of-packet sequences. Illustratively, each transceiver will maintain a list of one or more valid start-of-packet delimiter values, i.e., start-of-packet delimiters which that transceiver will accept. When a transceiver receives a transmitted data packet, it will compare the start-of-packet delimiter of the received packet to the list of valid start-of-packet delimiters. If the start-of-packet delimiter value matches one of the valid start-of-packet delimiter values for the receiving transceiver, the transceiver accepts the packet and proceeds with processing the data that follows the start-of-packet delimiter. If the start-of-packet delimiter does not match any of the valid start-of-packet values (and the start-of-packet sequence further does not match a valid hard-reset value as described below), the transceiver rejects the packet. In this way, the USB transceiver can ignore packets not intended for that transceiver. This system architecture allows multiple transceivers to use the same wire to talk to one another.

For the purposes of this disclosure, "accepting" a data packet means, for example, proceeding to perform the cyclic redundancy check (CRC) on the associated data packet and, if the packet passes the CRC check, forwarding the packet to the protocol layer for processing. In an illustrative embodiment, when a data packet passes the CRC check, the receiving transceiver sends an acknowledgement message called a GoodCRC message to the transceiver that sent the packet. For the purposes of this disclosure, "rejecting" a data packet means, for example, that the packet is discarded without performing a CRC check on the packet. Because no CRC check is performed, the receiving transceiver does not send the GoodCRC acknowledgement message to the transceiver that sent the packet.

In an illustrative embodiment, the system also maintains multiple hard-reset values so that specified ones of the transceivers, such as transceivers 110, 120, and 140, can be reset without resetting all of the transceivers in the system. Per the USB-PD Specification, a reset is a necessary response to protocol errors or other error conditions. The USB-PD Specification defines two types of resets: a soft reset, which resets protocol, and a hard reset, which resets both protocol and the power supplies. A hard reset is signaled by the transmission of a predefined hard-reset sequence by one of the transceivers in the system. Both the sending transceiver and the recipient transceiver shall cause their respective power supplies to return to their default states. In addition, both the sending transceiver and the recipient transceiver shall reset their respective protocol layers as is done with the soft reset procedure. This allows the attached devices to be in a state where they can re-establish USB-PD communication.

According to an illustrative embodiment of the present disclosure, a transmitting transceiver can effect a specification of one or more specific transceivers to reset via the selection of which hard-reset sequence it uses. Each transceiver in the system, i.e., coupled to the USB wire, will have one or more hard-reset sequences that it will recognize. That is, each transceiver is configured to perform a hard reset when it receives a specified one or more of the hard-reset sequences and to ignore any other hard-reset sequences. Illustratively, each transceiver will maintain a list of one or more valid hard-reset values, i.e., hard-reset sequences which that transceiver will recognize. When a transceiver receives transmitted data and the bit sequence following the preamble does not match one of that transceiver's valid start-of-packet delimiters, it will compare the bit sequence following the preamble to its list of valid hard-reset sequences. If the bit sequence matches one of the valid hard-reset sequences for the receiving transceiver, the transceiver performs the hard reset procedure. If the bit sequence following the preamble does not match any of the valid start-of-packet values or any of the valid hard-reset values, the transceiver rejects the data. In this way, the USB transceiver can ignore hard-reset messages not intended for that transceiver. Again, this system architecture further allows multiple transceivers to use the same line to communicate with each other.

Figure 4:
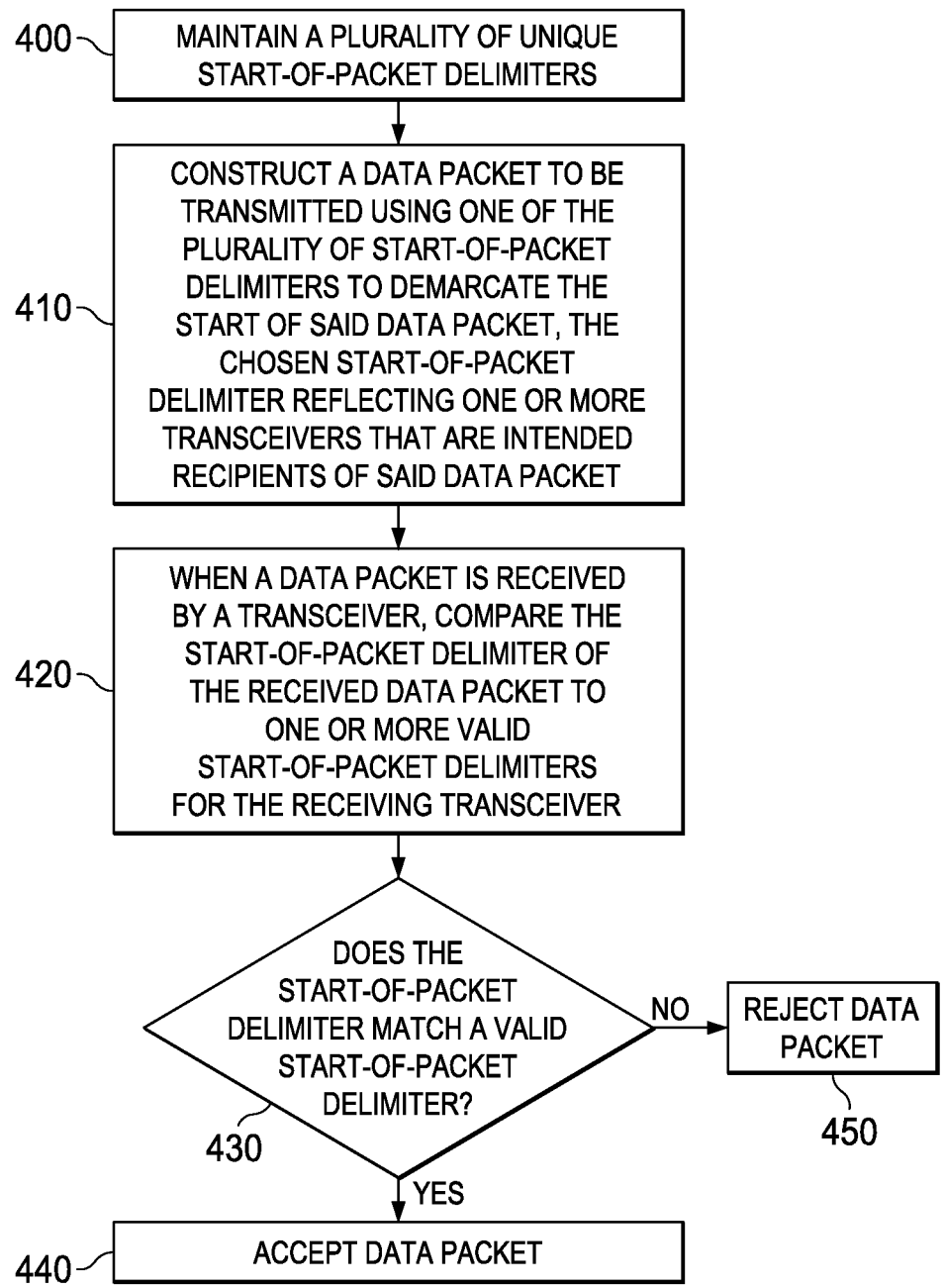
FIG. 4 is a flowchart representing a method of operating a communication system.

FIG. 4 is a flowchart representing a method of operating a communication system. At block 400, a plurality of unique start-of-packet delimiters are maintained. At block 410, a data packet to be transmitted is constructed using a specified one of the plurality of start-of-packet delimiters to demarcate the start of said data packet. The start-of-packet delimiter that is chosen reflects one or more transceivers that are intended recipients of the data packet. At block 420, when a data packet is received by a transceiver, the start-of-packet delimiter of the received data packet is compared to one or more valid start-of-packet delimiters for the receiving transceiver. At the decision box 430, it is queried whether the start-of-packet delimiter of the received data packet matches a valid start-of-packet delimiter for the receiving transceiver. If it does, the data packet is accepted, as indicated at block 440. If it does not, the data packet is rejected, as indicated at block 450.

FIG. 5 is a flowchart representing a method of operating a data transmitter to indicate an intended one or more recipients of a data packet to be transmitted. At block 500, a plurality of unique start-of-packet delimiters are maintained. Each start-of-packet delimiter is associated with one or more transceivers that are potential communication partners. At block 510, it is determined which one or more transceivers are intended recipients of a data packet to be transmitted. At block 520, one of said plurality of start-of-packet delimiters are selected based on which one or more transceivers are intended recipients of the data packet. At block 530, the data packet is constructed using the selected start-of-packet delimiter to demarcate the start of the data packet.

FIG. 6 is a flowchart representing a method of specifying an intended recipient of a data packet to be transmitted. At block 600, a first start-of-packet delimiter associated with a first one or more recipient transceivers is maintained. At block 610, a second start-of-packet delimiter associated with a second one or more recipient transceivers is maintained. At block 620, when constructing a data packet intended for said first one or more recipient transceivers, the data packet is constructed using the first start-of-packet delimiter to demarcate the start of the data packet. At block 630, when constructing a data packet intended for said second one or more recipient transceivers, the data packet is constructed using the second start-of-packet delimiter to demarcate the start of the data packet.

Thus, according to illustrative embodiments of the present disclosure, multiple start-of-packet delimiters are maintained and the selection of which start-of-packet delimiter to use for a given data packet dictates which transceivers will accept that data packet. In certain embodiments, multiple hard-reset sequences are also maintained and the selection of which hard-reset sequence is used dictates which transceivers will be reset. In such a system, the determination of what specific bit sequences to use for the multiple start-of-packet delimiters and the multiple hard-reset sequences has significant implications for the complexity and performance of the system. To determine optimal sequences for the start-of-packet delimiters and hard-reset sequences, two primary criteria were used: limiting the complexity of the implementation, and minimizing the probability of mistaking one bit sequence for another. With these criteria in mind, various metrics were used to compare bit sequences. One such metric is the ratio of the number of bits that are the same to the total number of bits (twenty in the illustrative embodiments described herein) when compared to each of the other sequences. This metric should be minimized to reduce the probability of mistakenly detecting one sequence instead of another. This ratio when compared to the hard-reset sequence was prioritized since mistakenly detecting a hard reset may be considered catastrophic.

Another metric used to assess the effectiveness of different bit sequences for the multiple start-of-packet delimiters and hard-reset sequences is the DC balance ratio (DCBR). The signal should be as DC balanced as possible, meaning the ratio of 1's to the total number of bits in the sequence should be as close to 0.5 as possible. A ratio between 0.4 and 0.6 is considered sufficient because that is the ratio for the standard start-of-packet delimiter and hard-reset sequences as defined in the USB specification.

Another metric used to assess the effectiveness of different bit sequences is the number of bit positions at which a given bit sequence differs from every other bit sequence. It is desirable to ensure that each bit sequence differs from every other sequence by at least six bits (out of the twenty). This ensures that at least two 5-bit nibbles must be demodulated incorrectly in order to mistake one 20-bit sequence for another. Alternatively, the number of nibbles that are different between any two sequences can be restricted to be larger than 1. In some embodiments, it is acceptable to have only one nibble be different between sequences so this constraint could be relaxed.

Another metric used to assess the effectiveness of different bit sequences is the number of correlations needed to distinguish the possible nibbles at any point in the sequence. It is desirable to minimize this number in order to minimize the complexity of the system. In an illustrative implementation of the system, the incoming demodulated bit stream is correlated with all possible sequences of interest. Thus, in an illustrative embodiment wherein three distinct start-of-packet delimiters and two distinct hard-reset sequences are maintained, the incoming bitstream is correlated with five different 20-bit sequences. If there are N sequences of interest, then this requires 20*N comparisons (or multiplications) for each incoming 20-bit sequence. A lower complexity implementation is to correlate for just one nibble at a time. Then if a match is found, a correlation is performed for the next nibble. This lower complexity implementation requires the nibbles to be designed appropriately. Depending on the design of the sequences, this implementation may require between 5 and N*5 comparisons per incoming nibble. We define the term comparisons per nibble (CPN) as a metric for the complexity of a given sequence. The CPN of the nibble having the highest CPN is used as the overall CPN for that 20-bit sequence. A lower CPN value indicates a lower complexity. In an illustrative embodiment, one complexity reduction that is employed where possible is making two of the nibbles of a given 20-bit sequence opposite of each other in each bit. When this condition is present, both nibbles can be checked with one correlation. Thus only five comparisons are needed to check both nibbles.

To demonstrate the process of selecting optimal bit sequences to use for the various start-of-packet delimiters and hard-reset sequences, some examples of potential start-of-packet delimiters and hard-reset sequences will be described below. It is to be understood that the bit sequences used in the examples of Tables 2-4 below are merely illustrative and that the criteria used to generate and analyze the bit sequences in Tables 2-4 can be applied for generating any number of sequences.

In the illustrative bit sequences of Tables 2-4 below, the 20-bit sequences are made up of four predefined 5-bit nibbles, referred to as K-codes in the USB specification. The definitions of the K-codes used in these examples is as set forth in Table 1. In Table 1, the K-codes Sync-1, Sync-2, RST-1 and RST-2 are pre-existing K-codes, i.e., K-codes that are defined and used in pre-existing versions of the USB specification. The Sync-3 and Sync-4 K-codes shown in Table 1 are new K-codes that have been defined for the purposes of the present disclosure.

TABLE 1

K-code definitions.

| Name | 5b Symbol | Description |
| --- | --- | --- |
| Sync-1 | 11000 | Startsynch #1 |
| Sync-2 | 10001 | Startsynch #2 |
| Sync-3 | 00110 | Startsynch #3 |
| Sync-4 | 01100 | Startsynch #4 |
| RST-1 | 00111 | Hard Reset #1 |
| RST-2 | 11001 | Hard Reset #2 |

Table 2 shows a set of four different start-of-packet delimiters labelled SOP, SOPa, SOPb, and SOPc. The start-of-packet delimiter labelled SOP is the standard start-of-packet delimiter as defined in the USB specification and is comprised of the predefined K-codes Sync-1 (11000), Sync-1 (11000), Sync-1 (11000) and Sync-2 (10001). Since the right-most bit in the K-code is the first one applied to the wire, the complete SOP bit sequence is 00011000110001110001. Similarly, the bit sequences of the start-of-packet delimiters SOPa, SOPb and SOPc are as shown in Table 2. Also shown in Table 2 is the standard hard-reset sequence as defined in the USB specification. As indicated in Table 2, the first three 5-bit nibbles (K-code #1, K-code #2 and K-code #3) of each start-of-packet delimiter and hard-reset sequence each has a comparisons-per-nibble (CPN) metric of 5. The fourth 5-bit nibble (K-code #4) of each sequence, meanwhile, has a CPN of 10. Thus the overall CPN for each bit sequence is 10, since the CPN of the nibble having the highest CPN is used as the overall CPN for that bit. The overall CPNs of 10 for each sequence are quite low, which helps to minimize the complexity of the system of Table 2. Also, the scheme set forth in Table 2 does not introduce any new 5-bit nibbles (K-codes) with respect to pre-existing versions of the USB-PD specification, which further minimizes the complexity of the system. The DC balance ratios (DCBRs) of SOPa, SOPb and SOPc are each 0.5, which is ideal. The DCBR of the standard USB start-of-packet delimiter SOP is 0.4 and the DCBR of the standard USB hard-reset sequence is 0.55. Thus all of the DCBRs are within the preferred range of 0.4-0.6. In Table 2, each of the start-of-packet delimiters SOP, SOPa, SOPb and SOPc differs from the hard-reset sequence in at least six bit positions, which is less than optimal as it is more likely to result in mistaking one of the start-of-packet delimiters for the hard-reset sequence than are start-of-packet delimiters that differ from the hard-reset sequence at more bit positions.

TABLE 2

System having very low complexity.

| Sequence Label | K-code #1 CPN = 5 | K-code #2 CPN = 5 | K-code #3 CPN = 5 | K-code #4 CPN = 10 |
| --- | --- | --- | --- | --- |
| SOP | Sync-1 (11000) | Sync-1 (11000) | Sync-1 (11000) | Sync-2 (10001) |
| HardReset | RST-1 (00111) | RST-1 (00111) | RST-1 (00111) | RST-2 (11001) |
| SOPa | Sync-1 (11000) | Sync-1 (11000) | RST-1 (00111) | RST-2 (11001) |
| SOPb | Sync-1 (11000) | RST-1 (00111) | Sync-1 (11000) | RST-2 (11001) |
| SOPc | Sync-1 (11000) | RST-1 (00111) | RST-1 (00111) | Sync-2 (10001) |

Table 3 shows a set of four different start-of-packet delimiters labelled SOP, SOPa, SOPb, and SOPc, as well as a hard-reset sequence. The start-of-packet delimiter labelled SOP is the standard start-of-packet delimiter as defined in the USB specification, and the hard-reset sequence in Table 3 is the standard hard-reset sequence as defined in the USB specification. The scheme of Table 3 takes advantage of the fact that the RST-1 K-code (00111) is the inverse of Sync-1 (11000), and Sync-3 (00110) is the inverse of RST-2 (11001), to help keep the comparisons per nibble (CPN) low. As indicated in Table 3, the first 5-bit nibble (K-code #1) of each start-of-packet delimiter and hard-reset sequence has a CPN of 5. The last three 5-bit nibbles (K-codes #2, #3 and #4) of each sequence, meanwhile, all have a CPN of 10.

Thus the overall CPN for each bit sequence is 10. With overall CPNs of 10 for each sequence, the bit sequences of Table 3 help to minimize the complexity of the system, though not quite as much as do the bit sequences of Table 2, whose bit sequences have three out of the four nibbles with CPNs of just 5. The scheme set forth in Table 3 introduces one new 5-bit nibble, namely the Sync-3 K-code (00110), thus increasing the complexity of the system somewhat relative to the system of Table 2, which introduces no new K-codes with respect to pre-existing versions of the USB specification. However, an introduction of just one new K-code is not an onerous increase in complexity. The DCBR of SOPa is 0.5, while the DCBRs of SOPb and SOPc are 0.4, which are in the preferred range, though somewhat higher than the DCBRs of Table 2. In Table 3, each of the start-of-packet delimiters SOP, SOPa, SOPb and SOPc differs from the hard-reset sequence in at least sixteen bit positions, which significantly reduces the chances of mistaking one of the start-of-packet delimiters for a hard-reset sequence, which may be considered a catastrophic error.

TABLE 3

System having low complexity and very high performance.

| Sequence Label | K-code #1 CPN = 5 | K-code #2 CPN = 10 | K-code #3 CPN = 10 | K-code #4 CPN = 10 |
|---|---|---|---|---|
| SOP | Sync-1 (11000) | Sync-1 (11000) | Sync-1 (11000) | Sync-2 (10001) |
| HardReset | RST-1 (00111) | RST-1 (00111) | RST-1 (00111) | RST-2 (11001) |
| SOPa | Sync-1 (11000) | RST-2 (11001) | RST-2 (11001) | Sync-3 (00110) |
| SOPb | Sync-1 (11000) | Sync-3 (00110) | Sync-1 (11000) | Sync-3 (00110) |
| SOPc | Sync-1 (11000) | Sync-1 (11000) | Sync-3 (00110) | Sync-3 (00110) |

Table 4 shows a set of four different start-of-packet delimiters labelled SOP, SOPa, SOPb, and SOPc, and also includes two different hard reset sequences, which allow the specifying of which transceivers in the system are to be reset. The hard-reset sequence labelled HardReset is the standard hard-reset sequence as defined in the USB specification, while the hard-reset sequence labelled HardReseta is a new hard-reset sequence defined for the purposes of the present disclosure. The start-of-packet delimiter labelled SOP is the standard start-of-packet delimiter as defined in the USB specification. As indicated in Table 4, the first 5-bit nibble (K-code #1) of each start-of-packet delimiter and hard-reset sequence has a CPN of 5. The last three 5-bit nibbles (K-codes #2, #3 and #4) of each sequence, meanwhile, all have a CPN of 15. Thus the overall CPN for each bit sequence is 15. These CPN=15 values for each sequence contribute to a relatively higher system complexity. The scheme set forth in Table 4 introduces two new 5-bit nibbles, namely the Sync-3 K-code (00110) and the Sync-4 K-code (01100), thus further increasing the complexity of the system somewhat relative to the systems of Tables 2 and 3. However, these additional K-codes are in part necessitated by the introduction of the additional hard-reset sequence. The DCBRs of the bit sequences of Table 4 are in the preferred range of 0.4-0.6. In Table 4, each of the start-of-packet delimiters SOP, SOPa, SOPb and SOPc differs from the legacy hard-reset sequence (HardReset) in at least sixteen bit positions, significantly reducing the chances of mistaking one of the start-of-packet delimiters for the legacy hard-reset sequence. Each of SOP, SOPa, SOPb and SOPc differs from the new hard-reset sequence (HardReseta) in at least eleven bit positions. The legacy hard-reset sequence (HardReset) differs from the new hard-reset sequence (HardReseta) at 12 bit positions, reducing the risk of mistaking one of the hard-reset sequences for the other.

TABLE 4

High performance system having two hard-reset sequences.

| Sequence Label | K-code #1 CPN = 5 | K-code #2 CPN = 15 | K-code #3 CPN = 15 | K-code #4 CPN = 15 |
|---|---|---|---|---|
| SOP | Sync-1 (11000) | Sync-1 (11000) | Sync-1 (11000) | Sync-2 (10001) |
| HardReset | RST-1 (00111) | RST-1 (00111) | RST-1 (00111) | RST-2 (11001) |
| SOPa | Sync-1 (11000) | Sync-2 (10001) | Sync-1 (11000) | Sync-4 (01100) |
| SOPb | Sync-1 (11000) | RST-1 (00111) | Sync-4 (01100) | Sync-3 (00110) |
| SOPc | Sync-1 (11000) | Sync-1 (11000) | Sync-3 (00110) | Sync-3 (00110) |
| HardReseta | RST-1 (00111) | Sync-4 (01100) | RST-2 (11001) | Sync-3 (00110) |

As previously mentioned, the standard start-of-packet delimiter as defined in the USB-PD specification is defined as three Sync-1 K-codes (11000) followed by one Sync-2 K-code (10001). This standard start-of-packet delimiter is referred to in the USB-PD specification, and in the present disclosure, as SOP. Per the USB specification, any transceiver that is USB power-delivery-capable, i.e., that is either a USB power-delivery provider, provider/consumer, consumer, or consumer/provider, shall be able to both detect and send data packets having the standard start-of-packet delimiter SOP. In an illustrative embodiment of the present disclosure, sending and receiving of packets having the standard start-of-packet delimiter SOP is limited to power-delivery-capable downstream-facing ports (DFPs) and power-delivery-capable upstream-facing ports (UFPs), that is, power-delivery-capable ports on USB-PD hosts and USB-PD devices. In an illustrative embodiment, transceivers residing in the USB cable, such as cable plug transceivers, for example, shall neither send nor accept packets having the standard start-of-packet delimiter SOP.

According to an illustrative embodiment of the present disclosure, a second start-of-packet delimiter, unique from the standard start-of-packet delimiter SOP, is maintained to enable exclusive communications between a USB-PD device and a transceiver residing in the USB cable such as a cable plug transceiver. This second start-of-packet delimiter, which will be designated SOP' herein, allows such exclusive communications between a USB-PD device and the cable plug transceiver, for example, to be targeted specifically at the intended recipient, rather than broadcasting the communication to all transceivers coupled to the wire on which the communication is transmitted. In an illustrative embodiment of the present disclosure, this second start-of-packet delimiter SOP' is defined as two Sync-1 K-codes (11000) followed by two Sync-3 K-codes (00110). Thus in this embodiment, SOP'=00011000110001101100. This specific second start-of-packet delimiter has been determined to be effective at enabling low-complexity implementations and minimizing the probability of mistaking one start-of-packet delimiter for another, using analysis similar to and including the analysis described above with respect to Tables 2-4.

According to an illustrative embodiment of the present disclosure, a cable plug transceiver capable of SOP' communications shall use said second start-of-packet delimiter SOP' in all data packets that it transmits, and shall only be able to detect data packets having said second start-of-packet delimiter SOP'. In this illustrative embodiment, a USB-PD downstream-facing port (DFP) or a USB-PD source device that needs to be able to communicate with a cable plug transceiver that is capable of SOP' communications shall be capable of communicating using both packets starting with the standard start-of-packet delimiter SOP and packets starting with the second start-of-packet delimiter SOP'. Thus such a DFP or source device shall be able to detect packets having the SOP' start-of-packet delimiter, and when such a DFP or source device wants to send a communication to the cable plug transceiver it will do so using a packet starting with the SOP' start-of-packet delimiter. In an illustrative embodiment, the DFP or source device coordinates SOP and SOP' communications so as to avoid collisions.

When a cable plug transceiver that supports SOP' communications receives an incoming data packet, it checks the start-of-packet delimiter of the incoming packet. If the SOP' start-of-packet delimiter is not detected, the transceiver ignores the entire transmission. When a USB-PD downstream-facing port (DFP) or USB-PD source device that supports SOP' communications receives an incoming data packet, it checks the start-of-packet delimiter of the incoming packet. If the SOP or SOP' start-of-packet delimiter is detected, the packet is accepted and processed per the transceiver's usual packet processing procedures. If, on the other hand, the SOP or SOP' start-of-packet delimiter is not detected, the transceiver ignores the entire transmission.

Some USB cables can have multiple transceivers residing therein. For example, a USB cable having a USB plug on each end can have a transceiver associated with each plug. In an illustrative embodiment, in such cases, two alternative start-of-packet delimiters are maintained, in addition to the standard USB start-of-packet delimiter, in order to allow targeted communications with one of the cable plug transceivers but not the other. Thus in an illustrative embodiment, in addition to the SOP and SOP' start-of-packet delimiters defined above, a third start-of-packet delimiter, which will be designated SOP'' herein, is maintained to allow exclusive communications between a USB-PD device and one of the cable plug transceivers. In an illustrative embodiment of the present disclosure, this third start-of-packet delimiter SOP'' is defined as the following sequence of K-codes: Sync-1 (11000), Sync-3 (00110), Sync-1 (11000), Sync-3 (00110). Thus in this embodiment, SOP''=00011011000001101100. This specific third start-of-packet delimiter has been determined to be effective at enabling low-complexity implementations and minimizing the probability of mistaking one start-of-packet delimiter for another, using analysis similar to and including the analysis described above with respect to Tables 2-4.

According to an illustrative embodiment of the present disclosure, only a cable having SOP' communication capability in one of its cable plugs shall support SOP'' communication in the other cable plug. No cable shall support only SOP'' communication. Similarly, only downstream-facing ports (DFPs) that support SOP' communication shall support SOP'' communications. No DFP shall support SOP'' communication but not SOP' communication. In an illustrative embodiment, a cable plug transceiver capable of SOP'' communications shall use the third start-of-packet delimiter SOP'' in all data packets that it transmits, and shall only be able to detect data packets having said third start-of-packet delimiter SOP''. In this illustrative embodiment, a USB-PD downstream-facing port (DFP) or a USB-PD source device that needs to be able to communicate with two different cable plug transceivers shall be capable of communicating using packets starting with either the standard start-of-packet delimiter SOP, the second start-of-packet delimiter SOP', or the third start-of-packet delimiter SOP''. Thus such a DFP or source device shall be able to detect packets having the SOP'' start-of-packet delimiter, and when such a DFP or source device wants to send a communication to the SOP''-capable cable plug transceiver it will do so using a packet starting with the SOP'' start-of-packet delimiter. In an illustrative embodiment, the DFP or source device coordinates SOP, SOP' and SOP'' communications so as to avoid collisions.

When a cable plug transceiver that supports SOP'' communications receives an incoming data packet, it checks the start-of-packet delimiter of the incoming packet. If the SOP'' start-of-packet delimiter is not detected, the transceiver ignores the entire transmission. When a USB-PD downstream-facing port (DFP) or USB-PD source device that supports SOP'' communications receives an incoming data packet, it checks the start-of-packet delimiter of the incoming packet. If one of the SOP, SOP' or SOP'' start-of-packet delimiter is detected, the packet is accepted and processed per the transceiver's usual packet processing procedures. If, on the other hand, the SOP, SOP' or SOP'' start-of-packet delimiter is not detected, the transceiver ignores the entire transmission. In an illustrative embodiment, USB-PD upstream-facing ports (UFPs) shall not support SOP' or SOP'' communications. Therefore such transceivers shall not use the SOP' or SOP'' start-of-packet delimiter when sending packets, and if such a transceiver receives an incoming data packet having the SOP' or SOP'' start-of-packet delimiter, it shall ignore the entire transmission.

As previously mentioned, in an illustrative embodiment, the system also maintains multiple hard-reset values so that specified ones of the transceivers coupled to the USB cable, such as transceivers 110, 120, and 140 in FIG. 1, can be reset without resetting all of the transceivers in the system. As previously mentioned, the USB specification defines a standard hard-reset code that is placed immediately following the preamble of the packet, in place of the start-of-packet delimiter, to effect the hard reset of transceivers that receive the hard-reset sequence. The standard hard-reset sequence as defined by the USB-PD specification comprises three RST-1 K-codes (00111) followed by one RST-2 K-code (11001). Thus the standard hard-reset sequence is 11100111001110010011. Per the USB specification, both USB device transceivers and cable plug transceivers shall perform a hard reset whenever the hard-reset sequence is detected following the packet preamble.

According to an illustrative embodiment of the present disclosure, the system maintains a second hard-reset sequence, referred to herein as a cable-reset sequence, for the purpose of resetting transceivers residing in the USB cable, such as cable plug transceivers, without resetting the USB devices attached to the cable. In an illustrative embodiment, the cable-reset sequence is defined as the following sequence of K-codes: RST-1 (00111), Sync-1 (11000), RST-1 (00111), and Sync-3 (00110). Thus the cable-reset bit sequence is 11100000111110001100. This specific cable-reset bit sequence has been determined to be effective at enabling low-complexity implementations and minimizing the probability of mistaking one start-of-packet delimiter for another, using analysis similar to and including the analysis described above with respect to Tables 2-4.

Having thus described circuits and methods for distinguishing intended recipients of a data packet using start-of-packet delimiters and hard-reset sequences by reference to certain of their preferred embodiments, it is noted that the embodiments disclosed are illustrative rather than limiting in nature and that a wide range of variations, modifications, changes, and substitutions are contemplated in the foregoing disclosure. For example, while certain aspects of the invention are described with respect to a USB power delivery communication system, it will be understood that such aspects can also be applied to other types of communication systems other than USB-PD systems. Furthermore, in some instances, some features may be employed without a corresponding use of the other features. Accordingly, it is appropriate that the appended claims be construed broadly and in a manner consistent with the broad inventive concepts disclosed herein.

What is claimed is:

1. A method of operating a communication system, the method comprising:
    maintaining a plurality of unique start-of-packet delimiters;
    constructing a data packet to be transmitted using a specified one of the plurality of start-of-packet delimiters to demarcate the start of said data packet, the chosen start-of-packet delimiter reflecting one or more transceivers that are intended recipients of said data packet; and
    when a data packet is received by a transceiver:
        comparing the start-of-packet delimiter of the received data packet to one or more valid start-of-packet delimiters for the receiving transceiver; and
        if the start-of-packet delimiter of the received data packet matches a valid start-of-packet delimiter for the receiving transceiver, accepting said data packet, otherwise rejecting said data packet;
    wherein the communication system is a universal serial bus (USB) communication system and wherein said transceivers comprise USB power-delivery (USB-PD) transceivers.

2. The method of claim 1 wherein the communication system comprises a first transceiver, a second transceiver, and a third transceiver, and wherein the plurality of unique start-of-packet delimiters comprises a first start-of-packet delimiter and a second start-of-packet delimiter, wherein the first and second transceivers are capable of both sending and receiving data packets having either the first start-of-frame delimiter or the second start-of-frame delimiter, and wherein the third transceiver is capable of sending and receiving data packets having only the second start-of-packet delimiter.

3. The method of claim 2 wherein the first transceiver resides in a first USB-capable device and the second transceiver resides in a second USB-capable device, and wherein the third transceiver resides in a USB cable plug of a USB cable.

4. The method of claim 3 wherein the bit sequence of said first start-of-packet delimiter is 00011000110001110001 and the bit sequence of said second start-of-packet delimiter is 00011001110110001100.

5. The method of claim 4 wherein the communication system further comprises a fourth transceiver residing in a second USB cable plug of said USB cable, and wherein the plurality of unique start-of-packet delimiters further comprises a third start-of-packet delimiter, and wherein the first and second transceivers are capable of both sending and receiving data packets having the third start-of-frame delimiter, and wherein the fourth transceiver is capable of sending and receiving data packets having only the third start-of-packet delimiter.

6. The method of claim 5 wherein the bit sequence of said third start-of-packet delimiter is 00011011000001101100.

7. The method of claim 1, further comprising:
    maintaining a hard-reset code operable to cause a hard reset of any transceiver that receives said hard-reset code;
    if a hard reset of the transceivers in the communication system is desired, transmitting a communication having the hard-reset code in the start-of-packet delimiter portion of the transmitted data in place of a start-of-packet delimiter; and
    when a communication is received by a transceiver:
        comparing the start-of-packet delimiter portion of the transmitted data to the hard-reset code; and
        if the start-of-packet delimiter portion of the transmitted data matches the hard-reset code, performing a hard reset of the receiving transceiver.

8. The method of claim 7 wherein the communication system comprises a first transceiver, a second transceiver and a third transceiver, and wherein the method further comprises:
    maintaining a second hard-reset code operable to cause a reset of the third transceiver without causing a hard reset of the first and second transceivers;
    if a hard reset of the third transceiver but not the first and second transceivers is desired, transmitting a communication having the second hard-reset code in the start-of-packet delimiter portion of the transmitted data in place of a start-of-packet delimiter; and
    when a communication is received by the third transceiver:
        comparing the start-of-packet delimiter portion of the transmitted data to the second hard-reset code; and
        if the start-of-packet delimiter portion of the transmitted data matches said second hard-reset code, performing a hard reset of the third transceiver.

9. The method of claim 8 wherein the first transceiver resides in a first USB-capable device and the second transceiver resides in a second USB-capable device, and wherein the third transceiver resides in a USB cable plug of a USB cable.

10. A method of operating a data transmitter to indicate an intended one or more recipients of a data packet to be transmitted, the method comprising:
    maintaining a plurality of unique start-of-packet delimiters, each start-of-packet delimiter being associated with one or more transceivers that are potential communication partners;
    determining one or more transceivers that are intended recipients of a data packet to be transmitted;
    selecting one of said plurality of start-of-packet delimiters based on which one or more transceivers are intended recipients of said data packet; and
    constructing said data packet using the selected start-of-packet delimiter to demarcate the start of said data packet;
    wherein said data transmitter comprises a universal serial bus power-delivery (USB-PD) transmitter and wherein said one or more transceivers comprise USB-PD transceivers.

11. A method of operating a data transmitter to indicate an intended one or more recipients of a data packet to be transmitted, the method comprising:

maintaining a plurality of unique start-of-packet delimiters, each start-of-packet delimiter being associated with one or more transceivers that are potential communication partners;

determining one or more transceivers that are intended recipients of a data packet to be transmitted;

selecting one of said plurality of start-of-packet delimiters based on which one or more transceivers are intended recipients of said data packet; and constructing said data packet using the selected start-of-packet delimiter to demarcate the start of said data packet;

wherein said data transmitter is operable to communicate with a second transceiver and a third transceiver, wherein said plurality of unique start-of-packet delimiters comprises a first start-of-packet delimiter and a second start-of-packet delimiter, and wherein said selecting one of said plurality of start-of-packet delimiters comprises selecting the first start-of-packet delimiter if the second transceiver is the only intended recipient of the data packet and selecting the second start-of-packet delimiter if both the second and third transceivers are intended recipients of the data packet.

12. The method of claim 11 wherein said data transmitter comprises a universal serial bus power-delivery (USB-PD) transmitter residing in a first USB-capable device, said second transceiver comprises a USB-PD transceiver residing in a second USB-capable device, and said third transceiver comprises a USB-PD transceiver residing in a first USB cable plug of a USB cable.

13. The method of claim 12 wherein said data transmitter is further operable to communicate with a fourth USB-PD transceiver residing in a second USB cable plug of said USB cable, and wherein said plurality of unique start-of-packet delimiters further comprises a third start-of-packet delimiter, and wherein said selecting one of said plurality of start-of-packet delimiters comprises selecting the third start-of-packet delimiter if the second and fourth transceivers are the only intended recipients of the data packet.

14. A method of specifying an intended recipient of a data packet to be transmitted, the method comprising:

maintaining a first start-of-packet delimiter associated with a first one or more recipient transceivers;

maintaining a second start-of-packet delimiter associated with a second one or more recipient transceivers;

when constructing a data packet intended for said first one or more recipient transceivers, constructing said data packet using the first start-of-packet delimiter to demarcate the start of said data packet; and when constructing a data packet intended for said second one or more recipient transceivers, constructing said data packet using the second start-of-packet delimiter to demarcate the start of said data packet;

wherein said recipient transceivers comprise universal serial bus power-delivery (USB-PD) transceivers.

15. The method of claim 14 wherein said first one or more recipient transceivers comprises a first USB-PD transceiver residing in a USB-capable device, and said second one or more recipient transceivers comprises said first USB-PD transceiver and a second USB-PD transceiver residing in a USB cable plug of a USB cable.

16. A method of specifying an intended recipient of a data packet to be transmitted, the method comprising:

maintaining a first start-of-packet delimiter associated with a first one or more recipient transceivers;

maintaining a second start-of-packet delimiter associated with a second one or more recipient transceivers;

when constructing a data packet intended for said first one or more recipient transceivers, constructing said data packet using the first start-of-packet delimiter to demarcate the start of said data packet; and when constructing a data packet intended for said second one or more recipient transceivers, constructing said data packet using the second start-of-packet delimiter to demarcate the start of said data packet;

maintaining a third start-of-packet delimiter associated with a third one or more recipient transceivers;

when constructing a data packet intended for said third one or more recipient transceivers, constructing said data packet using the third start-of-packet delimiter to demarcate the start of said data packet;

wherein said first one or more recipient transceivers comprises a first universal serial bus power-delivery (USB-PD) transceiver residing in a USB-capable device, said second one or more recipient transceivers comprises said first USB-PD transceiver and a second USB-PD transceiver residing in a first USB cable plug of a USB cable, and said third one or more recipient transceivers comprises said first USB-PD transceiver, said second USB-PD transceiver, and a third USB-PD transceiver residing in a second USB cable plug of said USB cable.

* * * * *